3,755,428
Patented Aug. 28, 1973

3,755,428
DERIVATIVES OF α-ACYLHYDRAZINO-β-PHENYL-PROPIONIC ACID
Meyer Sletzinger, North Plainfield, Sandor Karady, Elizabeth, Manuel G. Ly, New Brunswick, and Seemon H. Pines, Murray Hill, N.J., assignors to Merck & Co., Inc., Rahway, N.J.
No Drawing. Original application Feb. 24, 1970, Ser. No. 13,770. Divided and this application June 24, 1971, Ser. No. 156,540
Int. Cl. C07c 103/32
U.S. Cl. 260—519                 2 Claims

ABSTRACT OF THE DISCLOSURE

Novel L-α-acylhydrazino-β-phenyl-propionitrile compounds useful as intermediates in the production of L-α-hydrazino-β-phenyl-propionic acids. Also included are processes for preparing the novel compounds of this invention by aminating L-α-acylamido-β-phenyl-propionitrile and processes for hydrolyzing the novel compounds of this invention to form L-α-hydrazino-β-phenyl-propionic acid compounds.

---

This application is a division of U.S. Ser. No. 13,770 filed Feb. 24, 1970 now U.S. Patent No. 3,676,480.

This invention relates to novel and useful chemical compounds and to a process for their preparation. More particularly, it relates to novel compounds which are intermediates in the preparation of L-α-hydrazino-β-phenyl-alkanoic acids.

It is known in the art that various α-hydrazino-β-phenyl-alkanoic acids are useful as decarboxylase inhibitors. It is further known that the D-isomer of these acids is generally inactive and may even be antagonistic to the action of the L-form, thereby reducing its potency.

In the past, it has been the accepted practice to separate stereoisomers by the formation of diastereomeric salts with either optically active bases or acids, depending on the nature of the racemate. However, with the hydrazino compounds of the present invention, separation is complicated by the fact that some diastereomeric salts do not form crystalline materials with sufficiently different properties so that the diastereomers can be readily crystallized. In some instances, the diastereomeric salts are oily or waxy materials which become difficult if not impossible to separate by conventional means. Quite obviously, if a relatively simple and inexpensive process could be found which would preferentially produce the desired L-α-hydrazino-β-phenyl-alkanoic acids, it would receive widespread acceptance in the art.

Accordingly, it is an object of this invention to prepare novel intermediate compounds. A further object of this invention is to provide a process for the formation of such intermediates. A still further object is to provide a process by which the novel intermediate products of this invention may be formed into useful final products. Other objects will become apparent from the ensuing description of this invention.

These objects are accomplished by the present invention which provides the L form of a compound of the formula:

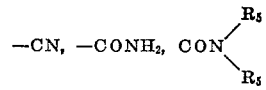

wherein:

R and R$_1$ each may be loweralkoxy, phenyloxy, benzyloxy or hydroxy;

R$_2$ is hydrogen or loweralkyl;
R$_3$ is

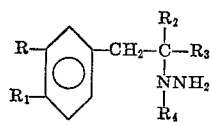

wherein
R$_5$ is loweralkyl, or —COOH; and
R$_4$ is loweralkanoyl or aroyl.

The "loweralkoxy" radical signifies an alkoxy group containing from 1 to about 6 carbon atoms and the "loweralkyl" radical signifies an alkyl group containing from 1 to about 6 carbon atoms which can be straight chained or branched. While in the most preferred compounds of this invention R$_4$ is loweralkanoyl, it is not necessary to limit R$_4$ to this class of substituents. R$_4$ may be any "acyl" radical derived from an organic acid by the removal of the hydroxyl group. It includes radicals derived from carboxylic acids, sulfonic acids and the like. Furthermore, R$_3$ may also include loweralkyl esters.

In the most preferred embodiments of the present invention R and R$_1$ each may be hydroxy or loweralkoxy, R$_2$ is loweralkyl, R$_3$ is CN and R$_4$ is acetyl.

The present invention also provides a process for preparing the L form of a compound of the formula:

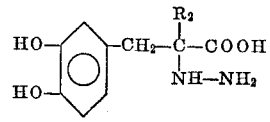

which comprises hydrolyzing the L form of a compound of the formula:

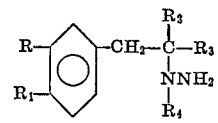

wherein R, R$_1$, R$_2$, R$_3$ and R$_4$ are as previously defined.

The present invention also provides a process for preparing the L form of a compound of the formula:

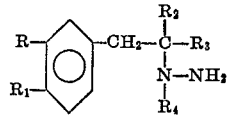

which comprises aminating the L form of a compound of the formula:

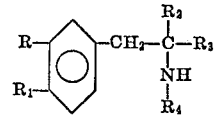

wherein R, R$_1$, R$_2$, R$_3$ and R$_4$ are as previously defined.

In carrying out the amination reaction of this invention, the acylaminonitrile may be treated with a base as for example an alkali metal hydride such as sodium hydride or potassium hydride or an alkali metal alkoxide such as potassium t-butoxide, potassium ethoxide, etc. to make the alkali metal salt before reacting it with a suitable aminating agent. The aminating agent may be chloramine, methoxyamine, O-arylhydroxyamine such as O-phenylsydroxylamine and O-(2-,4-dinitrophenyl)hydroxylamine, hydroxylamine-O-sulfonic acid and its esters or any other suitable aminating agent. In general, the amination reaction is carried out in a solvent at a temperature ranging from —70° to +150° C. Suitable solvents include water, methanol, ethanol, ethyl acetate, diethyl ether, hexane, chloroform, methylene chloride and the like. In a preferred embodiment of this invention the reaction is carried out with chloramine or methoxyamine at a temperature of from −30° to +100° C. and more preferably from −15° to +70° C.

After forming the aminated intermediate products of the present invention, they may be hydrolyzed with aqueous acid or base under moderate conditions to remove the acyl group. When other substituent groups such as the 3,4-dimethoxy or 3,4-dibenzyloxy are present in the R group, these can simultaneously be converted to hydroxyl groups under somewhat more drastic conditions for hydrolysis. Similarly, the various $R_2$ groups can be converted to the carboxyl group by varying the hydrolysis conditions. In general, the hydrolysis is carried out at a temperature of from about room temperature to 175° C., preferably 75° C. to 165° C. When it is desired to simultaneously convert the 3,4-dimethoxy or 3,4-dibenzyloxy to hydroxyl groups along with hydrolysis of the acyl radical, it is preferred that a concentrated (preferably fortified) hydrohalic acid such as hydrochloric or hydrobromic acid be used at a temperature of from 100° C. to 165° C. When such substituents are not present or it is not desired to convert the substituent groups, much less drastic conditions can be used and either an acid or a base in water will suffice for hydrolysis.

The following examples are presented to further illustrate the invention.

EXAMPLE 1

(A) L-α-(1-acetylhydrazino)-α-methyl-β-(3,4-dimethoxyphenyl)-propionitrile

Sodium hydride (250 mg., 55% in mineral oil, 5.2 mmoles) is washed with hexane and suspended in 6 ml. of DMSO. To this mixture is added a solution of L-α-acetamido - α - methyl-β-(3,4-dimethoxyphenyl)propionitrile (1.05 g., 4 mmoles) in 10 ml. of DMSO. After the gas evolution subsides (15 minutes) the solution is cooled to 15° C. and a solution of chloramine (4.5 mmoles) in 12 ml. of dry ether is added over a period of two minutes. After 12 hours of agitation at room temperature, a few drops of acetic acid is added and the mixture is concentrated in vacuo. The resulting syrup is partitioned between water and chloroform. The organic layer is dried, the solvent removed and the residue is crystallized from ethyl acetate and ether to yield crystalline material.

An analytical sample is prepared by recrystallization from methanol, M.P. 121–123° C.

*Analysis.*—Calcd. for $C_{14}H_{19}N_3O_3$ (percent): C, 60.63; H, 6.91; N, 15.15. Found (percent): C, 60.82; H, 7.10; N, 15.21.

(B) L-α-hydrazino-α-methyl-β-(3,4-dihydroxyphenyl)propionic acid

A solution of the product from the previous step (150 mg.) in 2.5 ml. of concentrated hydrochloric acid is heated in a sealed tube at 120° C. for 1½ hours. The resulting mixture is evaporated to dryness in vacuo and the product leached out with ethanol. The hydrazino acid is precipitated by addition of diethylamine to pH 6.4, the mixture filtered and the precipitate washed with ethanol and dried to yield L-α-hydrazino - α - methyl-β-(3,4-dihydroxyphenyl)-propionic acid. Recrystallization from water containing a small amount of sodium bisulfide yields the product, M.P. 208° dec., $[\alpha]_D = -17.3°$ (C=2, $CH_3OH$).

EXAMPLE 2

(A) L-α-(1-acetylhydrazino)-α-ethyl-β-(3,4-dimethoxyphenyl)propionitrile

Sodium hydride (250 mg., 55% in mineral oil, 5.2 mmoles) is washed with hexane and suspended in 6 ml. of DMSO. To this mixture is added a solution of L-α-acetamido-α-ethyl-β-(3,4 - dimethoxyphenyl)propionitrile (4 mmoles) in 10 ml. of DMSO. After the gas evolution subsides (15 minutes) the solution is cooled to 15° C. and a solution of chloramine (4.5 mmoles) in 12 ml. of dry ether is added over a period of two minutes. After 12 hours of agitation at room temperature a few drops of acetic acid is added and the mixture is concentrated in vacuo. The resulting syrup is partitioned between water and chloroform. The organic layer is dried, the solvent removed and the residue is crystallized from ethylacetate and ether to yield crystalline material.

(B) L-α-ethyl-α-hydrazino-β-(3,4-dihydroxyphenyl) propionic acid

A solution of the product from the previous step in 2.5 ml. of concentrated hydrochloric acid is heated in the sealed tube at 120° C. for 1½ hours. Using the procedure of Example 1(B), the hydrazino acid is obtained.

EXAMPLE 3

(A) L-α-(1-acetylhydrazino)-α-methyl-β-(3-hydroxy-4-methoxyphenyl)-propionitrile To a solution of L-α-acetamido-α-methyl-β-(3-hydroxy-4-methoxyphenyl) propionitrile (4 mmoles) in 10 ml. of DMSO is added 8 mmoles of potassium t-butoxide. After 15 minutes the solution is cooled to 15° C. and a solution of chloramine (4.5 mmoles) in 12 ml. of dry ether is added over a period of two minutes. After 12 hours of agitation at room temperature a few drops of acetic acid is added and the mixture is concentrated in vacuo. The resulting syrup is partitioned between water and chloroform. The organic layer is dried, the solvent removed and the residue is crystallized from ethylacetate and ether to yield crystalline material.

(B) L-α-hydrazino-α-methyl-β-(3,4-dihydroxyphenyl)-propionic acid

A solution of the product from the previous step in 2.5 ml. of concentrated hydrochloric acid is heated in the sealed tube at 120° C. for 1½ hours. Utilizing the procedure of Example 1(B), the hydrazino acid is obtained.

EXAMPLE 4

(A) L-α-(1-acetylhydrazino)-α-methyl-β-(3,4-dihydroxyphenyl)-propionitrile

Potassium hydride (13 mmoles, 55% in mineral oil) is washed with hexane and suspended in 6 ml. of DMSO. To this mixture is added a solution of L-α-acetamido-α-methyl β-(3,4-dihydroxyphenyl)propionitrile (4 mmoles) in 10 ml. of DMSO. After the gas evolution subsides (15 minutes) the solution is cooled to 15° C. and a solution of O-2,4-dinitrophenylhydroxylamine (4.5 mmoles) in 12 ml. of dry dioxane is added over a period of two minutes. After 12 hours of agitation at room temperature a few drops of acetic acid is added and the mixture is concentrated in vacuo. The resulting syrup is partitioned between dilute NaOH solution and ether. The organic layer is dried, the solvent removed and the residue is crystallized from ethylacetate and ether to yield crystalline material.

(B) Lα-hydrazino-α-methyl-β-(3,4-dihydroxyphenyl) propionic acid

A solution of the product from the previous step in 2.5 ml. of concentrated hydrochloric acid is heated to reflux for 1½ hours. Utilizing the procedure of Example 1(B), the hydrazino acid is obtained.

EXAMPLE 5

(A) L-α-hydrazino-α-methyl-β-(3,4-dimethoxyphenyl) propionic acid

To an ice cold solution of L-α-amino-α-methyl-β-(3,4-dimethoxyphenyl)propionic acid hydrochloride (2.2 g., 8 mmoles) in 2.5 N sodium hydroxide is added 1.8 g. (16 mmoles) of hydroxylamine-o-sulfonic acid. After 10 minutes, the mixture is heated at 90° C. for one hour. The solution is acidified with hydrochloric acid and evaporated to dryness in vacuo. The residue is digested with ethanol and the crude product precipitated by addition of diethylamine to pH 6.5. The mixture is purified by chromatography. After recrystallization from water L-α-hydrazino-α-methyl-β-(3,4-dimethoxyphenyl)propionic acid is obtained, M.P. 222–224° C. dec.

*Analysis.*—Calcd. for $C_{12}H_{18}N_2O_4 \cdot H_2O$ (percent): C, 52.93; H, 7.40; N, 10.29. Found (percent): C, 53.01; H, 7.46; N, 10.28.

(B) L-α-hydrazine-α-methyl-β-(3,4-dihydroxyphenyl) propionic acid

A mixture of L-α-(3,4-dimetroxybenzyl)-α-hydrazinopropionic acid (10.0 g., 32.2 mmoles) and 150 ml. of concentrated hydrochloric acid is heated in a sealed tube at 120° C. for two hours. The resulting mixture is evaporated to dryness in vacuo and the product leached out with ethanol. The hydrazino acid is precipitated by addition of diethylamine to pH 6.4, the mixture filtered and the precipitate washed with ethanol and dried to yield L-α-hydrazino-α-methyl-β-(3,4-dihydroxyphenyl)propionic acid. Recrystallization from water containing a small amount of sodium bisulfite yields the product, M.P. 208° C. dec., $[\alpha]_D = 17.3°$ C. (C.=2, $CH_3OH$).

Analysis.—Calcd. for $C_{10}H_{14}N_2O_4 \cdot H_2O$ (percent): C, 49.17; H, 6.60; N, 11.47. Found (percent): C, 49.13; H, 6.74; N, 11.19.

EXAMPLE 6

(A) L-α-(1-benzoylhydrazino)-α-methyl-β-(3,4-dibenzyloxyphenyl)propionamide

Sodium hydride (250 mg., 55% in mineral oil, 5.2 mmoles) is washed with hexane and suspended in 6 ml. of DMSO. To this mixture is added a solution of L-α-benzamido-α-methyl-β-(3,4-dibenzyloxyphenyl)propionamide (4 mmoles) in 10 ml. of DMSO. After the gas evolution subsides (15 minutes) the solution is cooled at 15° C. and a solution of chloramine (4.5 mmoles) in 12 ml. of dry ether is added over a period of two minutes. After 12 hours of agitation at room temperature a few drops of acetic acid is added and the mixture is concentrated in vacuo. The resulting syrup is partitioned between water and chloroform. The organic layer is dried, the solvent removed and the residue is crystallized from ethylacetate and ether to yield crystalline material.

(B) L-α-hydrazino-α-methyl-β-(3,4-dihydroxyphenyl) propionic acid

A solution of the product from the previous step in 2.5 ml. of concentrated hydrochloric acid is heated in the sealed tube at 100° C. for 1½ hours. Utilizing the procedure of Example 1(B), the hydrazino acid is obtained.

EXAMPLE 7

(A) L-α-acethydrazino-α-ethyl-β-(3,4-dibenzyloxyphenyl)-propionitrile

Sodium hydride (250 mg., 55% in mineral oil, 5.2 mmoles) is washed with hexane and suspended in 6 ml. of DMSO. To a solution of L-α-acetamido-α-ethyl-β-(3,4-dibenzyloxyphenyl)propionitrile (4 mmoles) in 10 ml. of DMSO is added 5 mmoles of sodium methoxide. After 15 minutes the solution is cooled to 15° C. and a solution of chloramine (4.5 mmoles) in 12 ml. of dry ether is added over a period of two minutes. After 12 hours of agitation at room temperature a few drops of acetic acid is added and the mixture is concentrated in vacuo. The resulting syrup is partitioned between water and chloroform. The organic layer is dried, the solvent removed and the residue is crystallized from ethylacetate and ether to yield crystalline material.

(B) L-α-hydrazino-α-ethyl-β-(3,4-dihydroxyphenyl) propionic

A solution of the product from the previous step in 2.5 ml. of concentrated hydrochloric acid is heated in the sealed tube at 120° C. for 1½ hours. Utilizing the procedure of Example 1(B), the hydrazino acid is obtained.

EXAMPLE 8

(A) L-α-(1-acetylhydrazino)-α-methyl-β-(3,4-dimethoxyphenyl)-propionitrile

Sodium hydride (250 mg., 55% in mineral oil, 5.2 mmoles) is washed with hexane and suspended in 6 ml. of DMSO. To this mixture is added a solution of L-α-acetamido-α-methyl-β-(3,4-dimethoxyphenyl)propionitrile (4 mmoles) in 10 ml. of DMSO. After the gas evolution subsides (15 minutes) the solution is cooled to 15° C. and a solution of methoxyamine (4.5 mmoles) in 12 ml. of dry ether is added over a period of two minutes. After 12 hours of agitation at room temperature a few drops of acetic acid is added and the mixture is concentrated in vacuo. The resulting syrup is partitioned between water and chloroform. The organic layer is dried, the solvent removed and the residue is crystallized from ethyl acetate and ether to yield crystalline material.

(B) L-α-hydrazino-α-methyl-β-(3,4-dihydroxyphenyl)propionic acid

L-α-acethydrazino-α-methyl-β-(3,4-dimethoxyphenyl)-propionitrile (0.01 mole) is heated to 120° for 1½ hours in a sealed tube with concentrated hydrochloric acid for 3 hours. Concentration to dryness in vacuo yields L-α-hydrazino-α-methyl-β-(3,4-dihydroxyphenyl)propionic acid hydrochloride salt.

The hydrazino acid is freed from its salt by the use of an ion exchange resin or by dissolving in a minimum amount of ethyl alcohol and with an equimolar amount of ethyleneoxide. The precipitated hydrazino acid is recrystallized from water containing 0.1% sodium bisulphite.

EXAMPLE 9

(A) L-α-(1-acetylhydrazino)-α-ethyl-β-(3-hydroxy-4-methoxy-phenyl)-N,N-dimethylpropionamide To a solution of L-α-acetamido-α-ethyl-β-(3-hydroxy-4-methoxyphenyl)-N,N-dimethylpropionamide (0.1 mole) in dioxane (100 ml.) is added potassium t-butoxide (0.12 mole). After stirring the mixture at room temperature for 1 hour, O-phenylhydroxylamine (0.12 mole) is added. The mixture is heated at 50° C. for 1 hour and poured on water, extracted with chloroform, dried, and evaporated to yield L-α-(1-acetylhydrazino)-α-ethyl-β-(3-hydroxy-4-methoxyphenyl)-N,N-dimethylpropionamide.

(B) L-α-ethyl-α-hydrazino-β-(3,4-dihydroxyphenyl)propionic acid

A solution of the product from the previous step in 2.5 ml. of concentrated hydrochloric acid is heated in the sealed tube at 120° C. for 1½ hours. Utilizing the procedure of Example I(B), the hydrazino acid is obtained.

What is claimed is:
1. A compound of the formula:

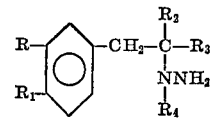

wherein:
R and $R_1$ each may be loweralkoxy, phenyloxy, benzyloxy or hydroxy;
$R_2$ is hydrogen or loweralkyl;
$R_3$ is —COOH; and
$R_4$ is loweralkanoyl.
2. A compound as in claim 1 wherein R and $R_1$ are loweralkoxy, $R_2$ is loweralkyl, $R_3$ is —COOH and $R_4$ is acetyl.

References Cited

Theilheimer, W.: Synthetic Methods of Org. Chem., vol 17 (1963), Pub. by S. Karger, N.Y., N.Y. (QPLC A14), p. 189 relied on.

LORRAINE A. WEINBERGER, Primary Examiner

L. A. THAXTON, Assistant Examiner

U.S. Cl. X.R.

260—465 D, 559 H